Figure 1:
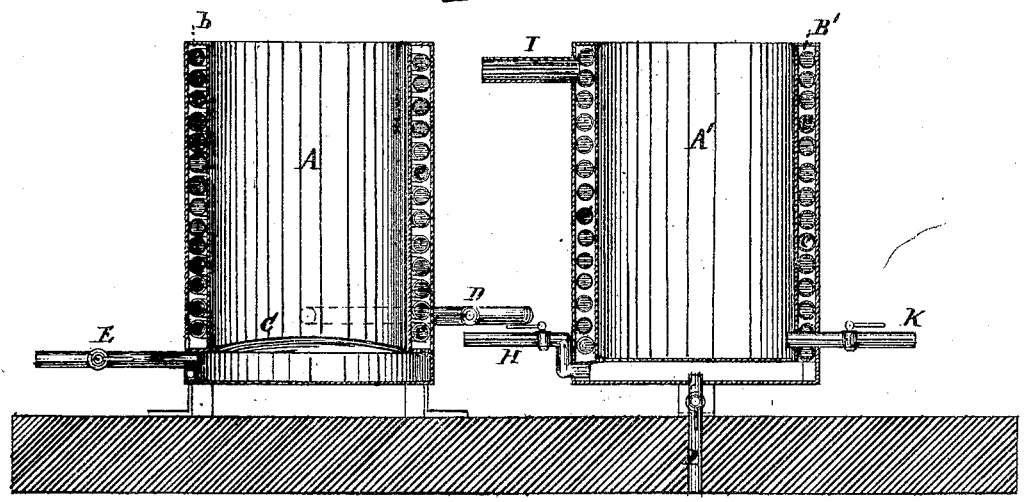

D. GREEN.
Improvement in the Manufacture of Yeast and in the
Application of the same in Mashing and Brewing.

No. 114,671. Patented May 9, 1871.

Witnesses:

Inventor:

United States Patent Office.

DUBY GREEN, OF NEW YORK, N. Y.

Letters Patent No. 114,671, dated May 9, 1871.

IMPROVEMENT IN THE MANUFACTURE OF YEAST AND IN THE APPLICATION OF THE SAME IN MASHING AND BREWING.

The Schedule referred to in these Letters Patent and making part of the same.

*To all whom it may concern:*

Be it known that I, DUBY GREEN, of the city, county, and State of New York, have invented a certain new and improved Process in the Manufacture and Manipulation of Yeast and the Preparation of Mashing Grain and its Manipulation, and in certain Devices used in such Processes and Manufacture; and I do hereby declare the following to be a true and correct description of such processes and devices, reference being had to the annexed drawing making a part of this my specification, illustrating the construction and arrangement of the devices referred to.

The following formula is used by me in the process of manufacture of the yeast, to be used for the purposes herein described:

To each one pound of small grain, adapted for this purpose, I apply, during the winter season, five pints of water, and during the summer one quart, for the reason that in the winter the yeast must be thinner than in the summer, so that during a regular period of time and a certain degree of temperature the yeast shall have the proper and regular quantity of what is termed "wine sour."

The difference in the quantity of water at the two different periods of time is, that in summer the excess of heat would tend to impart to the yeast what is termed "vinegar sour," if a greater quantity of water was used.

When small grain is used the water applied to it is to be at a temperature of 170° Fahrenheit, and the process of stirring or mashing is continued until the temperature is reduced to 150°; the tub or tubs in which the grain, &c., is placed is then covered, and remains in that condition two hours in winter and one hour in summer, at the end of which time the yeast becomes sweet. This product is then left, in winter, for the space of thirty-six hours, and in summer for the space of twenty-four hours undisturbed. After which time the temperature of the yeast is reduced to 65° Fahrenheit.

The next step in the process is to put in a quantity of yeast made out of eight bushels of small grain, in the manner described, two and one-half pounds of compressed yeast dissolved in two and one-half gallons of water at a temperature of 100° Fahrenheit, and add thereto one pound of tartaric acid and one pound of bicarbonate of soda, each of which is first dissolved in one gallon of water; the whole is then mixed and stirred together in a suitable tub or vessel that is covered, and allowed so to remain until the temperature of the mixture shall be raised from 65° to 83°.

When larger kind of grain is used, such as corn, I take and apply to each one hundred bushels of corn from two to eight bushels of yeast. The yeast used for the purpose in winter must be thirty-six hours, and in summer twenty-four hours old; and when the yeast is placed in the mash must have obtained heat at 7½° Reaumer or 18° Fahrenheit, before the stock can be taken away.

The quantity of stock taken away from the main yeast, and which is necessary to create a new stock, is forty-five gallons to every one hundred bushels of grain; after this result is obtained the yeast is allowed heat to the extent of about 5° Fahrenheit, and to this are added two parts of rye and one of barley malt. After the stock is taken away from the main yeast the same is then to be cooled as rapidly as possible to 53° Fahrenheit, or thereabout, and after the same is so cooled a uniformity of temperature is to be maintained until the same is again required to be used.

In case of accident, which might prevent the timely mash, the yeast intended for that day must be cooled as fast as possible, and reduced to 53° of Fahrenheit, in suitable yeast-tubes, as hereinafter described.

In order to strengthen the yeast, when required, I apply and mix with it two and one-half pounds of the carbonate of ammonia; and to prevent too much or too rapid fermentation, one pound of sulphuric acid; and to ascertain if the mash is dissolved, apply thereto five to six drops of the tincture of iodine; and to keep up a regular and even fermentation I apply one pound of cream-tartar; and to counteract any acid of vinegar in the yeast and to leave it in a good and suitable condition I apply the bicarbonate of soda, two pounds; and in order to test the acidity of said yeast or mash I insert within it litmus paper, and if the same is sour the paper will turn from its natural color, blue, to red; then dry said paper at the fire, and if the paper still remains red it is an indication that the yeast or mash is sour, but if it returns to its original blue color the same yeast or mash is in a suitable or proper condition.

In the manipulation of the mash I use thirty gallons of water to each bushel of grain instead of forty-five gallons, the amount commonly used. The meal will be mashed and scalded in from two to three hours by applying first weak steam, and the scalding completed by strong steam.

The means for scalding the mash can be accomplished as follows, to wit:

In a mash-tub having a double bottom of tin or copper, in which bottom are perforations or holes of about one-sixteenth inch in diameter, the double steam bottom must be adjusted two inches high from the lower bottom of the mash-tub in such a manner that the steam passing between the two shall have sufficient room to pass through into the mash, and so that, in cases required, steam from the main steam-pipe can be used.

When desired, I also use with every ninety-four bushels of grain six bushels of rye and grape-sugar instead of malt, in proportions of two pounds to each bushel of grain, and after the grape-sugar and rye have been placed into the mash-tub, the same is allowed to remain one-half hour, in order that the mash may have the opportunity to receive and become mixed with the above ingredients and receive the regular quantity of sugar.

Another method of preparing the mash that I employ is in the following proportions: to seventy-five bushels of corn I apply and use ten bushels of ground oats; by using the latter I protect the mash from the penetration of the air and cold; and by this arrangement or proportion of the parts the mash will have a bitter taste, and the acid of vinegar will not result during or at the end of the fermentation.

The proper fermentation of the mash is induced in the following manner:

As soon as the first quantity to be used is ready I fill up the first fermenting-tub with said mash, and add thereto the proper quantity of yeast in the same tub, which is then allowed to stand until the next mash is ready, and then the tubs are filled up.

During the summer period, after the mash ceases its fermentation partially or wholly, I fill the tub containing it with water until nearly full, which is of great advantage to the mash or beer, by which means is produced a rapid fermentation and with little liability to turn into acid of vinegar.

The unseasoned yeast is under no circumstances to be cooled with ice, as such an application has a tendency to entirely destroy the acid of wine contained in the yeast.

In the drawing—

Figure 1 is a sectional view of the yeast and mashing-tubs or vessels.

A' represents the yeast-tub or vessel that is surrounded by an outer jacket, B', and the space between the jacket and wall of the tub is used for the purpose of adjusting therein a cooling apparatus, consisting of the coiled pipes C.

Water is introduced into this coil by means of the inlet-pipe H, and expelled through the outlet-pipe I, which latter may be of larger diameter than the inlet-pipe. This arrangement admits sufficient supplies of water to cool the yeast in the tub or vessel, when desired.

K is a steam-pipe to admit the steam into the vessel or tub A' to impart the proper consistency to the yeast, the supply of steam being regulated by a cock in the pipe. A space, hollow, is left between the tub or vessel, at its bottom, and the jacket, and the water that may escape, or the condensation thereof, can be let off through the waste-pipe L.

The mash-tub is constructed in somewhat like manner to the yeast-tub, it being constructed with a surrounding jacket with spaces at sides and bottom, and with coiled pipes C, steam-pipe E, and outlet-pipe D. The supply of water to the coiled pipes is regulated in the same manner as shown in the yeast-tub or vessel. At or near the bottom of the mash-tub is shown a perforated bottom, G, that distributes the steam uniformly through the mash. The steam-pipe, as is seen, enters the chamber between the perforated chamber and the bottom of the outer jacket.

Figure 2:
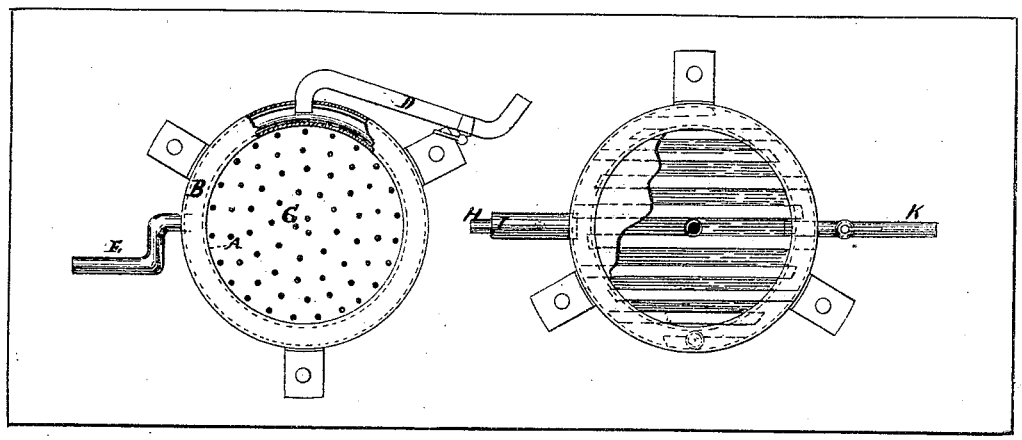

Figure 2 shows a top view of said tubs or vessels, and the letters upon the same represent the same parts in both figures.

What I claim as my invention, and desire to secure by Letters Patent, is—

1. The process herein described in the manufacture and manipulation of yeast.

2. The process herein described of preparing and manipulation of the mash.

3. The process of applying carbonate of ammonia to the yeast to strengthen the same, in the manner herein described.

4. The process herein described to prevent too great fermentation of the yeast.

5. The process herein described to determine when the mash is dissolved.

6. The process and means herein employed to promote uniform fermentation of the yeast.

7. The within-described process of removing acid of vinegar from the yeast.

8. The within-described process of determining and ascertaining if the yeast is sour.

9. The construction and arrangement of the mash and yeast-tubs in all and each of their parts, in the manner and for the purpose herein described.

10. The combination, in a yeast-tub, of the main vessel A', jacket B' with the coiled pipes C, water-pipe inlet H, steam-pipe K, and outlet-pipes I and L, in the manner and for the purpose herein described.

11. The combination, in a mash-tub, of the vessel A, jacket B with the coiled pipes C, perforated bottom G, steam-pipe E, and outlet-pipe D, in the manner and for the purpose herein described.

DUBY GREEN.

Witnesses:
JAMES E. DEXTER,
B. F. JENNESS.